United States Patent
Li et al.

(10) Patent No.: US 11,479,715 B2
(45) Date of Patent: Oct. 25, 2022

(54) ENHANCED FRICTION REDUCERS FOR WATER-BASED FRACTURING FLUIDS

(71) Applicant: Halliburton Energy Services, Inc., Houston, TX (US)

(72) Inventors: Leiming Li, Houston, TX (US); Liang Xu, Houston, TX (US); Todd Collier, Oklahoma City, OK (US)

(*) Notice: Subject to any disclaimer, the term of this patent is extended or adjusted under 35 U.S.C. 154(b) by 31 days.

(21) Appl. No.: 16/881,175

(22) Filed: May 22, 2020

(65) Prior Publication Data
US 2021/0363409 A1    Nov. 25, 2021

(51) Int. Cl.
| | |
|---|---|
| C09K 8/66 | (2006.01) |
| C09K 8/60 | (2006.01) |
| C09K 8/88 | (2006.01) |
| C09K 8/80 | (2006.01) |
| C09K 8/68 | (2006.01) |

(52) U.S. Cl.
CPC ............. C09K 8/602 (2013.01); C09K 8/68 (2013.01); C09K 8/80 (2013.01); C09K 8/882 (2013.01); C09K 2208/28 (2013.01)

(58) Field of Classification Search
CPC ...... C09K 2208/28; C09K 8/62; C09K 8/602; C09K 8/60; C09K 8/80; C09K 8/68; C09K 8/665; C09K 8/66; C09K 8/882; C09K 8/88; C09K 8/86; C09K 8/84
See application file for complete search history.

(56) References Cited

U.S. PATENT DOCUMENTS

| | | | | |
|---|---|---|---|---|
| 5,076,361 A | * | 12/1991 | Naae | C09K 8/90 166/294 |
| 5,902,784 A | * | 5/1999 | Hellsten | C10M 135/08 510/427 |
| 7,205,262 B2 | * | 4/2007 | Schwartz | B08B 9/0555 137/13 |
| 7,311,146 B1 | * | 12/2007 | Hanes, Jr. | C09K 8/68 166/279 |

(Continued)

FOREIGN PATENT DOCUMENTS

| WO | 2009010932 A2 | 1/2009 |
|---|---|---|
| WO | 2015053960 A1 | 4/2015 |

(Continued)

OTHER PUBLICATIONS

Tergitol 15-S-40, Sigma Aldrich, retrieved Jan. 9, 2021 from https://www.sigmaaldrich.com/catalog/product/sial/sts0002?lang=en&region=US# (Year: 2021).*

Primary Examiner — Angela M DiTrani Leff
(74) Attorney, Agent, or Firm — Sheri Higgins Law, PLLC; Sheri Higgins

(57) ABSTRACT

A fracturing fluid can include: a base fluid, wherein the base fluid comprises water; proppant; a friction reducer; and a friction reducer enhancer, wherein the friction reducer enhancer is a surfactant. The friction reducer enhancer can be in a concentration greater than or equal to a critical micelle concentration. Methods of fracturing a subterranean formation can include introducing the fracturing fluid into the subterranean formation. The friction reducer enhancer can increase the hydration rate of the friction reducer, whereby friction reduction of the fracturing fluid can occur much faster than without the friction reducer enhancer.

15 Claims, 4 Drawing Sheets

(56) References Cited

U.S. PATENT DOCUMENTS

| | | | | |
|---|---|---|---|---|
| 8,669,213 B2* | 3/2014 | Gupta | .................... | C09K 8/602 |
| | | | | 507/225 |
| 9,034,802 B2* | 5/2015 | Ahrenst | .................. | C09K 8/68 |
| | | | | 507/209 |
| 2009/0090506 A1* | 4/2009 | Schafer | .................. | E21B 27/02 |
| | | | | 166/278 |
| 2012/0048547 A1* | 3/2012 | Hughes | ................... | C09K 8/80 |
| | | | | 166/278 |
| 2012/0157354 A1* | 6/2012 | Li | .......................... | C09K 8/68 |
| | | | | 507/129 |
| 2013/0025867 A1* | 1/2013 | Sun | ......................... | C09K 8/68 |
| | | | | 166/308.1 |
| 2013/0029884 A1* | 1/2013 | Malchesky | ........... | C09K 8/605 |
| | | | | 507/219 |
| 2016/0017203 A1 | 1/2016 | Frederick et al. | | |
| 2017/0096597 A1* | 4/2017 | Hu | .......................... | C09K 8/82 |
| 2017/0362487 A1 | 12/2017 | Waterman et al. | | |
| 2019/0211255 A1 | 7/2019 | Tellakula | | |
| 2019/0242229 A1 | 8/2019 | Xu et al. | | |
| 2020/0190397 A1* | 6/2020 | Seymour-Loya | ...... | C09K 8/035 |
| 2020/0399531 A1* | 12/2020 | Trahan | ................... | C09K 8/845 |

FOREIGN PATENT DOCUMENTS

| | | | |
|---|---|---|---|
| WO | 2015171130 | A1 | 11/2015 |
| WO | 2019144127 | A1 | 7/2019 |

\* cited by examiner

ENHANCED FRICTION REDUCERS FOR WATER-BASED FRACTURING FLUIDS

TECHNICAL FIELD

Enhanced recovery of oil or gas from a subterranean formation can utilize stimulation techniques. Stimulation techniques can include fracturing operations. A fracturing fluid can include a variety of additives to provide desirable properties to the fracturing fluid.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
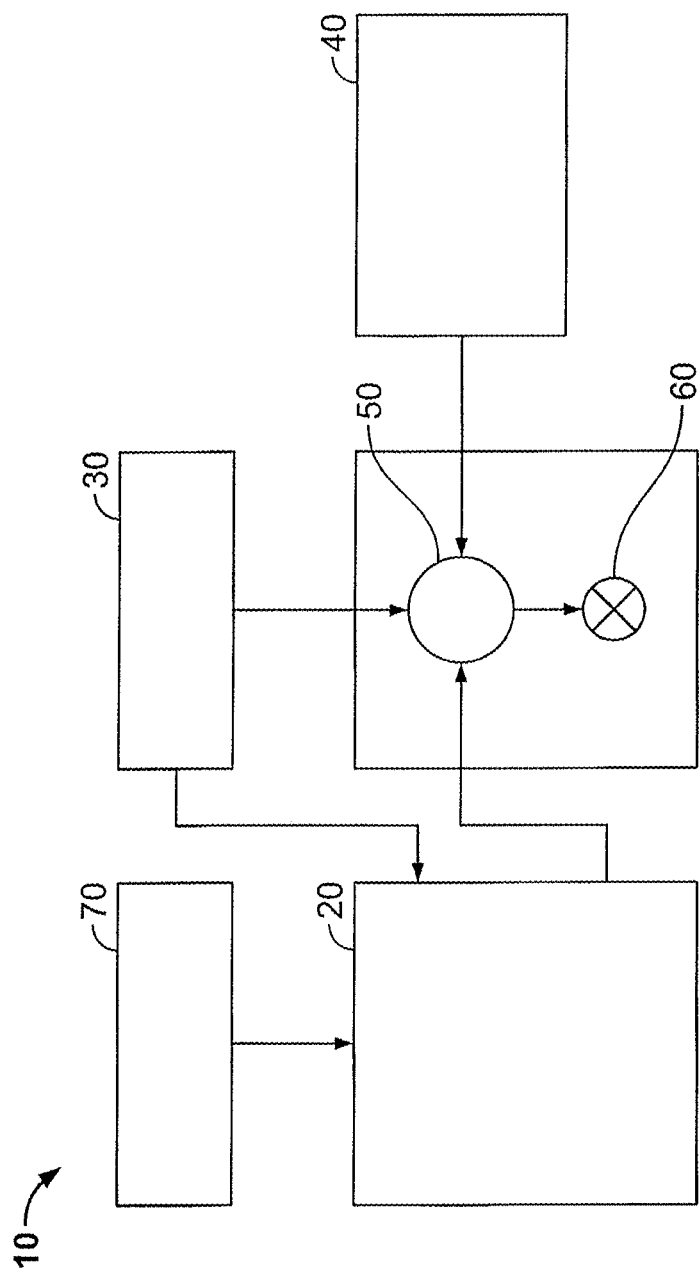
FIG. 1 is a diagram illustrating a stimulation system according to certain embodiments.

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of about 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a subterranean formation" means and includes into any portion of the well, including into the wellbore, into the near-wellbore region via the wellbore, or into the subterranean formation via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During wellbore operations, it is common to introduce a treatment fluid into the well. Examples of common treatment fluids include, but are not limited to, drilling fluids, spacer fluids, completion fluids, and stimulation fluids. As used herein, a treatment fluid is a fluid designed and prepared to resolve a specific condition of a well or subterranean formation, such as for stimulation, isolation, gravel packing, or control of gas or water coning. The term "treatment fluid" refers to the specific composition of the fluid as it is being introduced into a well. The word "treatment" in the term "treatment fluid" does not necessarily imply any particular action by the fluid.

A common stimulation treatment is a fracturing operation. A fracturing fluid "frac fluid" is pumped using a frac pump at a sufficiently high flow rate and high pressure into the wellbore and into the subterranean formation to create or enhance a fracture in the subterranean formation. Creating a fracture means making a new fracture in the formation. Enhancing a fracture means enlarging a pre-existing fracture in the formation. To fracture a subterranean formation typically requires hundreds of thousands of gallons of fracturing fluid. Further, it is often desirable to fracture at more than one downhole location.

Some frac fluids use emulsions having a liquid hydrocarbon external phase and an aqueous liquid as the internal phase. By contrast, a fracturing fluid can be water or water-based for various reasons, including the ready availability of water and the relatively low cost of water compared to other liquids. It is not uncommon to include produced water in a fracturing fluid in addition to or instead of freshwater. Produced water generally includes a high concentration of total dissolved solids (TDS), for example concentrations ranging from 500 to 300,000 milligrams per liter "mg/L". Total dissolved solids are the total amount of mobile charged ions, including minerals, salts, or metals dissolved in a given volume of water, expressed in units of milligrams per liter of water (mg/L).

The newly-created or enhanced fracture may tend to close together after pumping of the fracturing fluid has stopped. To prevent the fracture from closing, a material can be placed in the fracture to keep the fracture propped open. A material used for this purpose is often referred to as proppant. The proppant is in the form of solid sand or ceramic particles, which are generally suspended in the fracturing fluid, carried down hole, and deposited in the fracture as a proppant pack. The proppant pack props the fracture in an open position while allowing fluid flow through the permeability of the pack.

Some fracturing fluids are pumped at flow rates less than 60 barrels per minute "bpm," while other fracturing fluids are pumped at flow rates greater than 60 bpm, commonly referred to as slickwater fracturing. In order to pump the frac fluid at the required flow rate, a friction reducer can be added. The friction reducer functions to decrease the friction of the frac fluid against tubing strings and other wellbore equipment. Some friction reducers can reduce friction pressures by up to about 70-80%.

However, friction reducer packed in a friction reducer emulsion or slurry generally requires time to dissolve in the water and chemically activate before the friction reducer begins to reduce the friction. During this time, the pump may need to be operated at a faster flow rate in order to maintain the desired pressure in the wellbore, which can place mechanical stress on the pump. Thus, there is a need and an ongoing industry-wide concern for improved friction reducers that are low-cost, hydrate quickly, provide friction reduction in a shorter period of time, tolerate high TDS water, and tolerate high iron concentration in water.

A fracturing fluid can include: a base fluid, wherein the base fluid comprises water; proppant; a friction reducer; and a friction reducer enhancer, wherein the friction reducer enhancer is a surfactant and in a concentration greater than or equal to the critical micelle concentration.

Methods of performing a fracturing operation on a subterranean formation can include introducing the fracturing fluid into the subterranean formation.

It is to be understood that the discussion of any of the embodiments regarding the fracturing fluid ("frac fluid") or any ingredient in the frac fluid is intended to apply to all of the method and composition embodiments without the need to repeat the various embodiments throughout. Any reference to the unit "gallons" means U.S. gallons.

The fracturing fluid includes a base fluid. The base fluid can be the solvent or the continuous phase of the fracturing fluids. The base fluid according to any of the fracturing fluids can include water. The base fluid can include a hydrocarbon liquid as an internal phase of the base fluid. According to certain embodiments, the base fluid does not contain a hydrocarbon liquid (i.e., water is the solvent of the base fluid). The water according to any embodiment can be selected from the group consisting of freshwater, brackish water, saltwater, produced water, and any combination thereof. The base fluid can include dissolved solids, for example, water-soluble salts. The salt can be selected from the group consisting of sodium chloride, calcium chloride, calcium bromide, potassium chloride, potassium bromide, magnesium chloride, sodium bromide, cesium formate, cesium acetate, and any combination thereof. The total dissolved solids in the base fluid according to any of the fracturing fluids can be in the range from 500 to 300,000 mg/L of the water. The total dissolved iron in the base fluid according to any of the fracturing fluids can be in the range from about 1 mg/L to 1,000 mg/L.

The fracturing fluid can also include proppant. As used herein, the term "proppant" means a multitude of solid particles. The proppant can be naturally occurring, such as sand, or synthetic, such as a high-strength ceramic. Suitable proppant materials include, but are not limited to, sand (silica), walnut shells, sintered bauxite, glass beads, plastics, nylons, resins, other synthetic materials, and ceramic materials. Mixtures of different types of proppant can be used as well. The concentration of proppant in a fracturing fluid can be in any concentration known in the art, and preferably will be in the range of from about 0.01 kilograms to about 3 kilograms of proppant per liter of the base fluid (about 0.1 lb/gal to about 25 lb/gal). The size, sphericity, and strength of the proppant can be selected based on the actual subterranean formation conditions to be encountered during the fracturing operation.

The fracturing fluid can include a friction reducer. The friction reducer can be water soluble. As used herein, the term "water soluble" means that at least 1 gram dissolves in 1 liter of the water. The friction reducer can be a homopolymer or a copolymer. The polymer can be an anionic polymer, a cationic polymer, a nonionic polymer, or an amphoteric polymer.

A polymer is a molecule composed of repeating units, typically connected by covalent chemical bonds. A polymer is formed from monomers. During the formation of the polymer, some chemical groups can be lost from each monomer. The piece of the monomer that is incorporated into the polymer is known as the repeating unit or monomer residue. The backbone of the polymer is the continuous link between the monomer residues. The polymer can also contain pendant functional groups connected to the backbone at various locations along the backbone. Polymer nomenclature is generally based upon the type of monomer residues comprising the polymer. A polymer formed from one type of monomer residue is called a homopolymer. A polymer formed from two or more different types of monomer residues is called a copolymer. The number of repeating units of a polymer is referred to as the chain length of the polymer. The number of repeating units of a polymer can range from approximately 11 to greater than 10,000. In a copolymer, the repeating units from each of the monomer residues can be arranged in various manners along the polymer chain. For example, the repeating units can be random, alternating, periodic, or block. The conditions of the polymerization reaction can be adjusted to help control the average number of repeating units (the average chain length) of the polymer. Polymer molecules can be cross-linked. As used herein, a "cross-link" and all grammatical variations thereof is a bond between two or more polymer molecules. Cross-linked polymer molecules can form a polymer network.

A polymer has an average molecular weight, which is directly related to the average chain length of the polymer. The average molecular weight of a polymer has an impact on some of the physical characteristics of a polymer, for example, its solubility and its dispersibility. For a copolymer, each of the monomers will be repeated a certain number of times (number of repeating units). The average molecular weight ($M_w$) for a copolymer can be expressed as follows:

$$M_w = \Sigma w_x M_x$$

where $w_x$ is the weight fraction of molecules whose weight is $M_x$.

The friction reducer for any of the fracturing fluids can be selected from a polysaccharide, or a synthetic polymer, or any combination thereof. The synthetic polymer can be a polyacrylamide, a polyacrylamide derivative, an acrylamide copolymer, an anionic acrylamide copolymer, a cationic acrylamide copolymer, a nonionic acrylamide copolymer, an amphoteric acrylamide copolymer, a polyacrylate, a polyacrylate derivative, a polymethacrylate, a polymethacrylate derivative, and any combination thereof. By way of example and without limitation, a copolymer friction reducer can be poly(acrylamide-co-acrylic acid), an acrylamide copolymer comprising at least one monomer selected from 2-acrylamido-2-methylpropane sulfonic acid, acrylamido tertiary butyl sulfonic acid, or acrylic acid, the and related salts or esters of any of the foregoing. The polymeric friction reducer according to any of the fracturing fluids can be a non-cross-linked polymer. The polymeric friction reducer can have a molecular weight less than or equal to 5 million. The polymeric friction reducer can have a molecular weight less than or equal to 1 million.

The friction reducer can hydrate in the water. It is theorized that the friction reducer must hydrate sufficiently before a decrease in friction can occur. It is also theorized that the friction reducer must fully hydrate before a maximum friction reduction can occur. As used herein, the "initial hydration time" is the time at which a reduction in friction exceeds at least 40%. As used herein, the "final hydration time" is the time at which a maximum reduction in friction occurs. By way of example, it may take 1 min after addition of the friction reducer to the base fluid to achieve a 40% friction reduction, but may take 15 minutes to achieve the maximum friction reduction. The friction reducer can provide a reduction in friction of the fracturing fluids by at least 50%, at least 60%, or at least 70% in a time from 10 minutes (min) to 30 min after addition to the base fluid.

When a base fluid includes a high total dissolved solids (TDS) concentration, it is not uncommon for the friction reduction percent to be less compared to a base fluid without a high TDS concentration. The friction reducer can provide a friction reduction of any of the fracturing fluids containing at least 50,000 mg/L of TDS by at least 30%, at least 40%, or at least 45% in a time from 10 min to 30 min after addition to the base fluid. The molecular weight of the polymeric friction reducer can be selected to provide the desired percent decrease in friction.

The friction reducer for any of the fracturing fluids can be in a concentration in the range from 0.005% to 5% weight by weight (% w/w) of the base fluid. The concentration of the friction reducer can be selected to provide a desired percent friction reduction to the fracturing fluids. By way of example, if the base fluid includes a high concentration of TDS, then the concentration of the friction reducer may often need to be increased.

The fracturing fluids can include a friction reducer enhancer. The friction reducer enhancer according to any of the embodiments can enhance the properties of the friction reducer, such as, shortening the final hydration time of the friction reducer, increasing the percent of friction reduction at a same time (e.g., at 5 min after addition to the base fluid), and/or increasing the maximum friction reduction. According to various embodiments, the friction reducer enhancer reduces the final hydration time of the friction reducer by at least 25%, at least 50%, or at least 75% compared to a fluid without the friction reducer enhancer. By way of example, the friction reducer enhancer can reduce the final hydration time of the friction reducer from 12 min to 5 min.

The friction reducer enhancer can be a water-soluble surfactant. A surfactant is an amphiphilic molecule, comprising a hydrophobic tail group and a hydrophilic head group. The hydrophilic head can be charged. A cationic surfactant includes a positively-charged head. An anionic surfactant includes a negatively-charged head. A zwitterionic surfactant includes both a positively- and negatively-charged head. A surfactant with no charge is called a non-ionic surfactant. The friction reducer enhancer can be a cationic, anionic, zwitterionic, or non-ionic surfactant.

The surfactant can be selected from the group consisting of ethoxylated amines (e.g., ethoxylated tallow amine or polyethoxylated tallow amine), sulfonates (e.g., dodecylbenzene sulfonic acid salts), alkoxylated sulfates, ethoxylated primary and secondary alcohols, betaines and sultaines, poly and oligomeric glycosides, amine oxides, and combinations thereof.

If a surfactant is in a sufficient concentration in a solution, then the surfactant molecules can form micelles. A "micelle" is an aggregate of surfactant molecules dispersed in a solution. A surfactant in an aqueous solution can form micelles with the hydrophilic heads in contact with the surrounding aqueous solvent, sequestering the hydrophobic tails in the micelle center. The surfactant must be in a sufficient concentration to form micelles, known as the critical micelle concentration. The critical micelle concentration is the concentration of surfactant above which micelles are spontaneously formed. The surfactant according to any of the fluids can be added to the base fluid at the critical micelle concentration. Without being limited by theory, it is believed that the micelles interact with the polymer backbone of the friction reducer to lengthen the backbone, thereby causing hydration of the friction reducer in a shorter amount of time compared to a fluid without the friction reducer enhancer. The friction reducer enhancer can be in a concentration of 0.1 to 10 gallons per thousand gallons (gpt) of the base fluid.

The concentration of the friction reducer enhancer can also be selected such that the properties of the friction reducer are enhanced. The concentration of the friction reducer enhancer can be selected such that the final hydration time of the friction reducer is reduced by at least 25%, at least 50%, or at least 75% compared to a fluid without the friction reducer enhancer.

The friction reducer and the friction reducer enhancer can be part of a friction reducer package, especially in the water-based friction reducer slurries. The friction reducer package can include other additives. The friction reducer and the friction reducer enhancer can also be added separately to the base fluid. If added separately, in preferred embodiments, the friction reducer and friction reducer enhancer are added simultaneously or very close in time to each other, for example, through two different additive feeds.

Any of the fracturing fluids can be pumped at a desired flow rate and pressure. The fracturing fluid is preferably pumped at a flow rate and pressure that is above the fracture pressure of the subterranean formation in order to create or enhance one or more fractures. In an embodiment, the fracturing fluid can be pumped at a flow rate of less than 60 barrels per minute "bpm." In some embodiments, the frac fluid can be slickwater and pumped at high flow rates greater than 60 bpm.

The fracturing fluid can include a cross-linked polymer. The cross-linked polymer can be a viscosifying agent. The cross-linked polymer can be selected from guar, xanthan, and combinations thereof. The cross-linked polymer can be in a concentration in the range of about 1 to 120 "pptg" pounds per thousand gallons of the base fluid or 0.12 g/L to 14.4 g/L. Any of the frac fluids can have a viscosity in the range of 1 cP to 50 cP, a viscosity in the range of 8 cP to 50 cP, or a viscosity in the range of 10 cP to 20 cP.

The fracturing fluids can further include other additives. The other additives can include, but are not limited to, tackifying agents, resins, curable resins, curing agents for a curable resin, oxygen scavengers, alcohols, scale inhibitors, fluid-loss additives, oxidizers, bactericides, and biocides.

An embodiment of the present disclosure is a method of fracturing a subterranean formation comprising: introducing a fracturing fluid into the subterranean formation, wherein the fracturing fluid comprises: a base fluid, wherein the base fluid comprises water; proppant; a friction reducer; and a friction reducer enhancer, wherein the friction reducer enhancer is a surfactant; and creating or enhancing one or more fractures in the subterranean formation. Optionally, the method further comprises a base fluid having a total dissolved solids concentration in the range from 500 mg/L to 300,000 mg/L. Optionally, the method further comprises wherein the fracturing fluid does not contain a hydrocarbon liquid. Optionally, the method further comprises the friction reducer being a homopolymer or a copolymer. Optionally, the method further comprises the polymer being an anionic polymer, a cationic polymer, a nonionic polymer, or an amphoteric polymer. Optionally, the method further comprises the polymer being selected from the group consisting of a polysaccharide, a polyacrylamide, a polyacrylamide derivative, an acrylamide copolymer, a polyacrylate, a polyacrylate derivative, a polymethacrylate, a polymethacrylate derivative, and any combination thereof. Optionally, the method further comprises the polymer being a copolymer, and wherein the copolymer is an acrylamide copolymer comprising at least one co-monomer selected from 2-acrylamido-2-methylpropane sulfonic acid, acrylamido tertiary butyl sulfonic acid, or acrylic acid, and related salts or esters of any of the foregoing. Optionally, the method further comprises the polymer having a molecular weight less than or equal to 5 million. Optionally, the method further comprises the friction reducer having a concentration in the range from 0.005% to 5% weight by weight of the base fluid. Optionally, the method further comprises wherein the friction reducer enhancer reduces a final hydration time of the friction reducer by at least 25% compared to a fluid without the friction reducer enhancer. Optionally, the method further comprises the friction reducer enhancer being a water-soluble surfactant. Optionally, the method further comprises the surfactant being selected from the group consisting of ethoxylated amines, alkoxylated sulfates, ethoxylated primary and secondary alcohols, betaines and sultaines, poly and oligomeric glycosides, amine oxides, and combinations thereof. Optionally, the method further comprises the surfactant being an ethoxylated tallow amine or polyethoxylated tallow amine. Optionally, the method further comprises wherein the friction reducer enhancer is in a concentration greater than or equal to a critical micelle concentration. Optionally, the method further comprises the friction reducer enhancer having a concentration in the range of 0.1 to 10 gallons per thousand gallons of the base fluid. Optionally, the method further comprises wherein the fracturing fluid is introduced into the subterranean formation at a pump flow rate of greater than or equal to 60 barrels per minute.

An embodiment of the present disclosure is a fracturing fluid comprising: a base fluid, wherein the base fluid comprises water; proppant; a friction reducer; and a friction reducer enhancer, wherein the friction reducer enhancer is a surfactant. Optionally, the fluid further comprises a base fluid having a total dissolved solids concentration in the range from 500 mg/L to 300,000 mg/L. Optionally, the fluid further comprises wherein the fracturing fluid does not contain a hydrocarbon liquid. Optionally, the fluid further comprises the friction reducer being a homopolymer or a copolymer. Optionally, the fluid further comprises the polymer being an anionic polymer, a cationic polymer, a nonionic polymer, or an amphoteric polymer. Optionally, the fluid further comprises the polymer being selected from the group consisting of a polysaccharide, a polyacrylamide, a polyacrylamide derivative, an acrylamide copolymer, a polyacrylate, a polyacrylate derivative, a polymethacrylate, a polymethacrylate derivative, and any combination thereof. Optionally, the fluid further comprises the polymer being a copolymer, and wherein the copolymer is an acrylamide copolymer comprising at least one co-monomer selected from 2-acrylamido-2-methylpropane sulfonic acid, acrylamido tertiary butyl sulfonic acid, or acrylic acid, and related salts or esters of any of the foregoing. Optionally, the fluid further comprises the polymer having a molecular weight less than or equal to 5 million. Optionally, the fluid further comprises the friction reducer having a concentration in the range from 0.005% to 5% weight by weight of the base fluid. Optionally, the fluid further comprises wherein the friction reducer enhancer reduces a final hydration time of the friction reducer by at least 25% compared to a fluid without the friction reducer enhancer. Optionally, the fluid further comprises the friction reducer enhancer being a water-soluble surfactant. Optionally, the fluid further comprises the surfactant being selected from the group consisting of ethoxylated amines, alkoxylated sulfates, ethoxylated primary and secondary alcohols, betaines and sultaines, poly and oligomeric glycosides, amine oxides, and combinations thereof. Optionally, the fluid further comprises the surfactant being an ethoxylated tallow amine or polyethoxylated tallow amine. Optionally, the fluid further comprises wherein the friction reducer enhancer is in a concentration greater than or equal to a critical micelle concentration. Optionally, the fluid further comprises the friction reducer enhancer having a concentration in the range of 0.1 to 10 gallons per thousand gallons of the base fluid.

FIG. 1 depicts a well system that can be used according to embodiments of the present disclosure. A well system 10 of FIG. 1 can include a fracturing fluid producing apparatus 20, a fluid source 30, a proppant source 40, and a pump and blender system 50 and resides at the surface at a well site where a well 60 is located. In certain embodiments, the fracturing fluid producing apparatus 20 can combine additives with a fluid (e.g., liquid or substantially liquid) from fluid source 30, to produce a fracturing fluid that is used to stimulate a formation. The fracturing fluid can be a fluid for ready use in a fracturing operation of the well 60 or a concentrate to which additional fluid is added prior to use in a fracturing operation of the well 60. In other instances, the fracturing fluid producing apparatus 20 can be omitted and the fracturing fluid sourced directly from the fluid source 30.

The proppant source 40 can include a proppant for combining with a fracturing fluid. The system may also include additive source 70 that provides one or more additives (e.g., friction reducers, surfactants, and/or other optional additives) to alter the properties of the fracturing fluid.

The pump and blender system 50 can receive the base fluid and combine it with other components, including proppant from the proppant source 40 and/or additional additives from the additive source 70. The resulting mixture may be pumped into the well 60 under a pressure sufficient to create or enhance one or more fractures in a subterranean zone, for example, to stimulate production of fluids from the zone. The resulting mixture may also be pumped into the well 60 at a pressure less than the fracture pressure of the subterranean formation. The fracturing fluid producing apparatus 20, fluid source 30, and/or proppant source 40 can each be equipped with one or more metering devices (not shown) to control the flow of fluids, proppant, and/or other compositions to the pumping and blender system 50. Such metering devices may permit the pumping and the blender system 50 to pull from one, some, or all of the different sources at a given time, and may facilitate the preparation of fracturing fluids using continuous mixing or "on-the-fly" methods.

Figure 2:
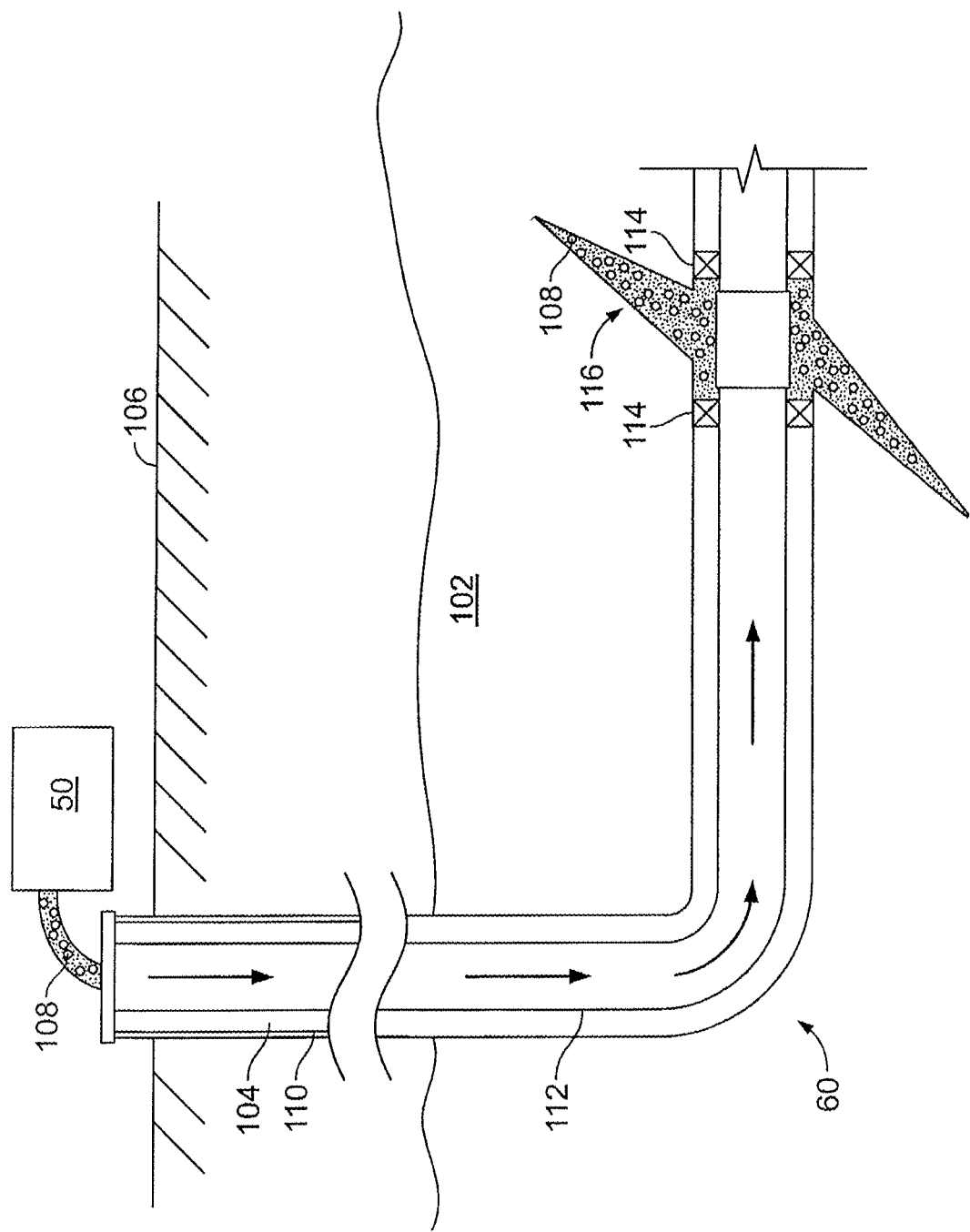
FIG. 2 is a diagram illustrating a well system in which a fracturing operation can be performed.

The step of introducing any of the fracturing fluids can comprise pumping the fracturing fluid into the subterranean formation. FIG. 2 shows the well 60 during a fracturing operation in a portion of a subterranean formation 102. The fracturing operation can be performed, for example, using the fracturing fluids. The subterranean formation can be penetrated by a well. The step of introducing can also include introducing any of the fracturing fluids into the well. The well includes a wellbore 104. The wellbore 104 extends from the surface 106, and the fracturing fluid 108 is introduced into a portion of the subterranean formation 102. The wellbore 104 can include a casing 110 that is cemented or otherwise secured to the wellbore wall. The wellbore 104 can be uncased or include uncased sections. Perforations can be formed in the casing 110 to allow fracturing fluids and/or other materials to flow into the subterranean formation 102. In cased wells, perforations can be formed using shaped charges, a perforating gun, hydro-jetting and/or other tools.

The well is shown with a work string 112. The pump and blender system 50 can be coupled to the work string 112 to pump the fracturing fluid 108 into the wellbore 104. The work string 112 can include coiled tubing, jointed pipe, and/or other structures that allow fluid to flow into the wellbore 104. The work string 112 can include flow control devices, bypass valves, ports, and or other tools or well devices that control a flow of fluid from the interior of the work string 112 into the subterranean formation 102. For example, the work string 112 can include ports (not shown) located adjacent to the wellbore wall to communicate the fracturing fluid 108 directly into the subterranean formation 102, and/or the work string 112 can include ports that are spaced apart from the wellbore wall to communicate the fracturing fluid 108 into an annulus that is located between the outside of the work string 112 and the wall of the wellbore.

The well system can include one or more sets of packers 114 that create one or more wellbore intervals. According to some embodiments, the methods also include creating or enhancing one or more fractures within the subterranean formation using the fracturing fluid. When the fracturing fluid is introduced into wellbore 104 (e.g., in FIG. 2, the wellbore interval located between the packers 114) at a sufficient hydraulic pressure, one or more fractures 116 may be created in the subterranean formation 102. The proppant particulates in the fracturing fluid may enter the fractures 116 where they may remain after the fluid flows out of the wellbore. The proppant can be placed into the one or more fractures during the step of introducing. The proppant can form a proppant pack within the one or more fractures.

Examples

To facilitate a better understanding of the various embodiments, the following examples are given.

Figure 3:
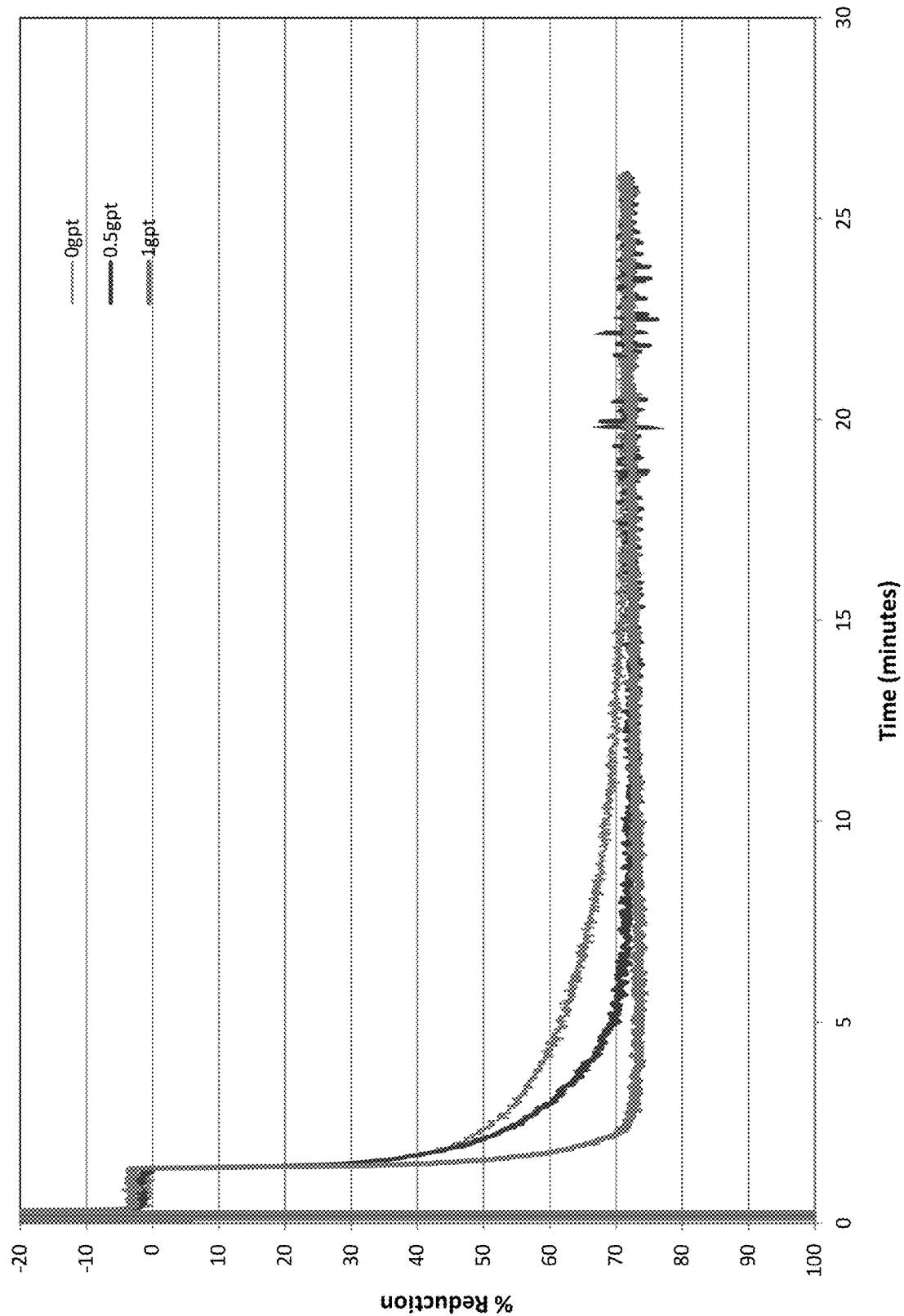
FIG. 3 is a line graph of % friction reduction versus time (min) of a friction reducer package.
Figure 4:
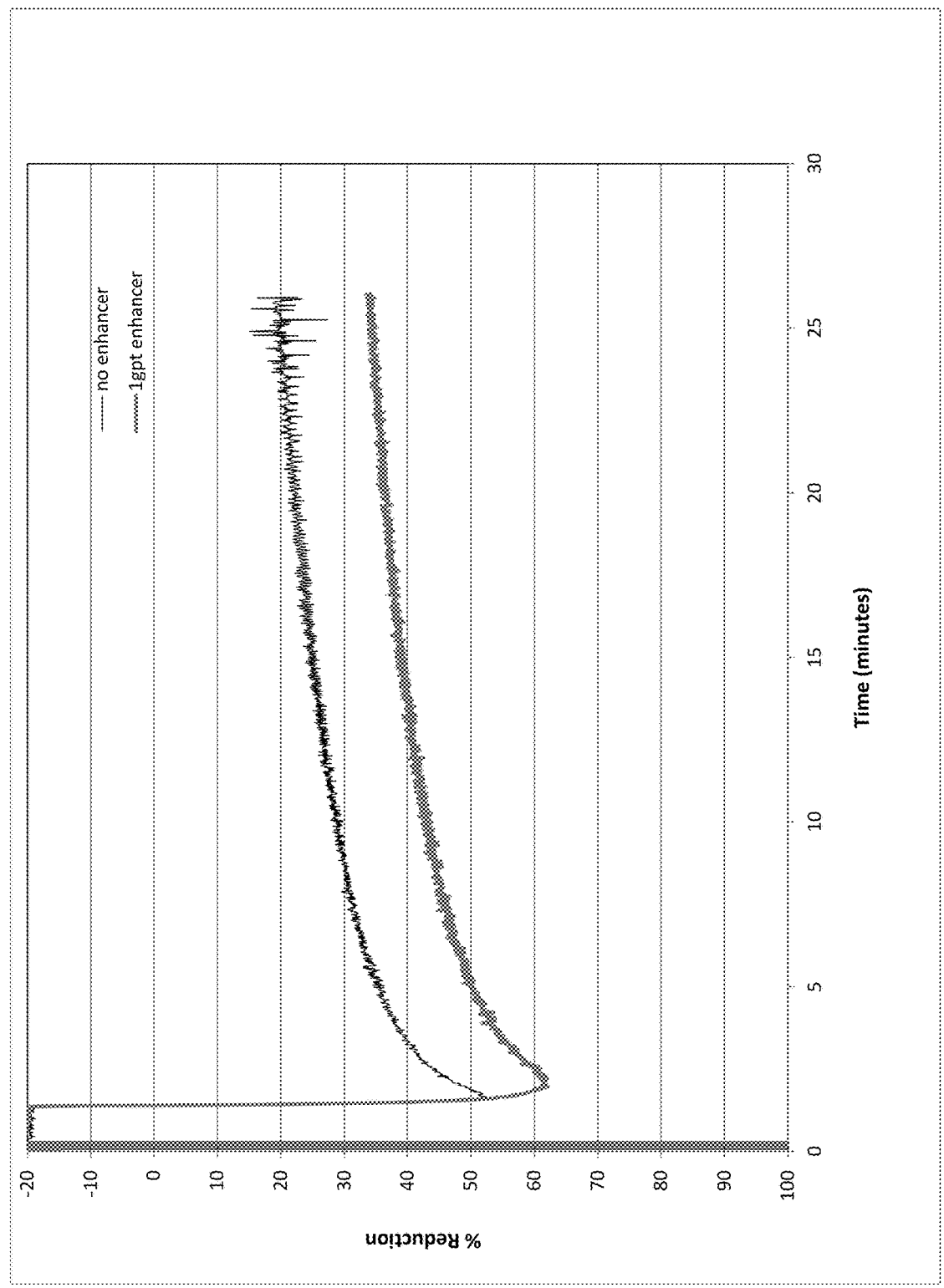
FIG. 4 is a line graph of % friction reduction versus time (min) of a friction reducer package in a heavy brine fluid.

FIGS. 3 and 4 are line graphs showing friction reduction testing of various test fluids. The water-based friction reducer slurry used in the testing contained an anionic acrylamide copolymer friction reducer, without containing any hydrocarbon, such as diesel or mineral oil. The MW of the anionic acrylamide copolymer in the friction reducer slurry was estimated to be mostly under about 5 million Da. Friction loop tests were carried out for a water-based friction reducer slurry containing the friction reducer and optionally an ethoxylated amine friction reducer enhancer as follows: 1 gallons per thousand gallons (gpt) of the friction reducer slurry was added to tap water in the friction loop, and friction reduction was measured at a flow rate of 10 gallons per minute (gpm) and a temperature of 72° F. (22.2° C.). If the friction reducer enhancer was added, it was added at the same time as the slurry containing the friction reducer.

The fluids for FIG. 3 in tap water included a control slurry that did not include the friction reducer enhancer, a slurry with the friction reducer enhancer at a concentration of 0.5 gpt, and a slurry with the friction reducer enhancer at a concentration of 1 gpt. As shown in FIG. 3, the control fluid without the friction reducer enhancer reached a maximum friction reduction of about 72% in approximately 15 minutes (min). However, with 0.5 gpt friction reducer enhancer added, the maximum friction reduction was reached after approximately 7 minutes, while 1 gpt of the friction reducer enhancer significantly reduced the time to reach the maximum value within about one minute. The addition of the friction reducer enhancer beyond 1 gpt did not further reduce the time to reach the maximum value. This indicates that the friction reducer enhancer could significantly reduce the final hydration time (i.e., increase the rate of hydration) of the friction reducer. As can also be seen, the friction reducer enhancer also increased the friction reduction value in the beginning of the test, compared with the baseline without the enhancer. Accordingly, the friction reducer enhancer would significantly enhance the performance of the friction reducer in fracturing operations.

FIG. 4 shows the results of friction loop tests wherein the base fluid contained a high total dissolved solids (commonly referred to in the industry as heavy brines or high-TDS produced water) exceeding 170,000 milligrams per liter (mg/L), the friction reducer and the friction reducer enhancer at a concentration of 1 gpt. A similar water-based friction reducer slurry was also tested at 1 gpt without the friction reducer enhancer, serving as the comparison. The type and concentration of the dissolved solids of the brine is shown below in Table 1. It Is important to note that the brine contained a high concentration of iron ions at 180 mg/L, which high concentrations of iron can generally be responsible for poor performance of friction reducers. As can be seen in FIG. 4, with the friction reducer enhancer, the friction reduction quickly reached the maximum value of about 62% within about 1 minute. Without the enhancer, the initial friction reduction maximum was only about 52%, and the friction reduction values were consistently lower over the whole testing period than the fluid with the enhancer. As discussed above, a high TDS value can reduce the performance of a friction reducer compared to a fluid with a low TDS value. Therefore, although the maximum value of approximately 62% was less than the maximum value of 72% from FIG. 3, the results indicate the friction reduction performance should be deemed as good, considering the extremely high TDS value of the brine. This also indicates that the concentration of the friction reducer and/or the friction reducer enhancer may be increased to increase the maximum friction reduction value.

TABLE 1

| Ion Species | Ion Concentration (mg/L) |
|---|---|
| Calcium | 16,000 |
| Magnesium | 1,700 |
| Iron | 180 |
| Barium | 1,900 |

TABLE 1-continued

| Ion Species | Ion Concentration (mg/L) |
|---|---|
| Strontium | 2,900 |
| Sodium | 44,000 |
| Potassium | 10 |
| Silicon | 0 |
| Boron | 0 |
| Sulfate | 10 |
| Bicarbonate | 470 |
| Chloride | 105,000 |

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the compositions, methods, and systems of the present disclosure are well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present disclosure.

As used herein, the words "comprise," "have," "include," and all grammatical variations thereof are each intended to have an open, non-limiting meaning that does not exclude additional elements or steps. While compositions, systems, and methods are described in terms of "comprising," "containing," or "including" various components or steps, the compositions, systems, and methods also can "consist essentially of" or "consist of" the various components and steps.

It should also be understood that, as used herein, "first," "second," and "third," are assigned arbitrarily and are merely intended to differentiate between two or more fluids, additives, etc., as the case may be, and does not indicate any sequence. Furthermore, it is to be understood that the mere use of the word "first" does not require that there be any "second," and the mere use of the word "second" does not require that there be any "third," etc.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of fracturing a subterranean formation comprising:
   introducing a fracturing fluid into the subterranean formation, wherein the fracturing fluid comprises:
      a base fluid, wherein the base fluid comprises water, and wherein the base fluid has a total dissolved iron concentration in the range of 50 to 1,000 mg/L;
      proppant;
      a friction reducer, wherein the friction reducer is a polymer, and wherein the polymer has a molecular weight less than or equal to 1 million; and
      a friction reducer enhancer, wherein the friction reducer enhancer is a surfactant, wherein the surfactant is an ethoxylated tallow amine or polyethoxylated tallow amine, and wherein the surfactant is in a concentration in the base fluid greater than or equal to its critical micelle concentration,
      wherein the fracturing fluid does not contain a hydrocarbon liquid, and
      wherein a first test fracturing fluid consisting of the base fluid having a total dissolved solids concentration of 170,000 mg/L, the proppant, the friction reducer, and the friction reducer enhancer has an increased friction reduction compared to a second test fracturing fluid consisting of the base fluid having a total dissolved solids concentration of 170,000 mg/L, the proppant, and the friction reducer;
   allowing the surfactant to form micelles in the fracturing fluid; and
   creating or enhancing one or more fractures in the subterranean formation.

2. The method according to claim 1, wherein the base fluid has a total dissolved solids concentration in the range from 500 mg/L to 300,000 mg/L.

3. The method according to claim 1, wherein the polymer is a homopolymer or a copolymer.

4. The method according to claim 3, wherein the polymer is an anionic polymer, a cationic polymer, a nonionic polymer, or an amphoteric polymer.

5. The method according to claim 4, wherein the polymer is selected from the group consisting of a polysaccharide, a polyacrylamide, a polyacrylamide derivative, an acrylamide copolymer, a polyacrylate, a polyacrylate derivative, a polymethacrylate, a polymethacrylate derivative, and combinations thereof.

6. The method according to claim 5, wherein the polymer is a copolymer, and wherein the copolymer is an acrylamide copolymer comprising at least one co-monomer selected from 2-acrylamido-2-methylpropane sulfonic acid, acrylamido tertiary butyl sulfonic acid, acrylic acid, or salts or esters of any of the foregoing.

7. The method according to claim 1, wherein the friction reducer is in a concentration in the range from 0.005% to 5% weight by weight of the base fluid.

8. The method according to claim 1, wherein the friction reducer enhancer reduces a final hydration time of the friction reducer in the fracturing fluid by at least 25% compared to a second fracturing fluid, wherein the second fracturing fluid has an identical composition to the fracturing fluid but does not include the friction reducer enhancer.

9. The method according to claim 1, wherein the friction reducer enhancer is a water-soluble surfactant.

10. The method according to claim 1, wherein the critical micelle concentration is in the range of 0.1 to 10 gallons per thousand gallons of the base fluid.

11. The method according to claim 1, wherein the step of introducing the fracturing fluid into the subterranean formation comprises using a pump.

12. The method according to claim 1, wherein the water is selected from the group consisting of freshwater, brackish water, saltwater, produced water, and any combination thereof.

13. The method according to claim 1, wherein the base fluid has a total dissolved iron concentration in the range from 150 mg/L to 1,000 mg/L.

14. The method according to claim 1, further comprising adding the friction reducer and the friction reducer enhancer to the base fluid.

15. The method according to claim 14, wherein the friction reducer and the friction reducer enhancer are added to the base fluid as a friction reducer package.

* * * * *